Patented Sept. 30, 1952

2,612,482

UNITED STATES PATENT OFFICE 2,612,482

WATER-REPELLENT COMPOSITIONS

Thomas J. Rasmussen, Schenectady, N. Y., assignor to General Electric Company, a corporation of New York No Drawing. Application March 17, 1950,
Serial No. 150,349

4 Claims. (Cl. 260—29.4)

This invention is concerned with compositions of matter suitable for rendering various materials, especially textile materials, water-repellent. More particularly, the invention is concerned with a composition of matter comprising (a) an aminoplast selected from the class consisting of urea-aldehyde and melamine-aldehyde resins or condensation products, (b) an organopolysiloxane, and (c) the product of hydrolysis of a methyldihalogenosilane corresponding to the general formula $CH_3SiHX_2$ where X is a halogen.

It has been known heretofore that solid bodies, for example, various textiles, can be rendered water-repellent by treatment of these materials with an organopolysiloxane. Thus, according to Norton Patent 2,386,259, various objects can be rendered water-repellent by treating the materials with the product of hydrolysis of a methyldihalogenosilane corresponding to the formula mentioned above. It has also been known as disclosed in Patnode Patent 2,306,222 that various objects can be rendered water-repellent by treatment with an organohalogenosilane. The use of various resinous materials in small concentrations has been employed for improving the water repellency of various textiles and increasing their crease resistance. Among such resins may be mentioned, for examples, condensation products of urea and an aldehyde as well as condensation products of melamine and an aldehyde.

I have now discovered that unexpectedly I am able to obtain improved water repellency, especially on textiles, by treating the latter with a mixture of ingredients comprising (a) a condensation product of either urea and an aldehyde or melamine and an aldehyde, (b) a liquid organopolysiloxane, and (c) a liquid hydrolysis product of a methyldihalogenosilane similar to those described in the aforementioned Norton patent. It was entirely unexpected and in no way could have been predicted that the use of this combination of treating materials would give water-repellency results which were superior in kind to results obtained by using any one of the individual ingredients separately for the treatment of textiles for the same purpose.

Among the urea and melamine resins which may be employed may be mentioned condensation products of either urea or melamine with any of the well known aldehydes, for instance, formaldehyde, acetaldehyde, propionaldehyde, furfural, etc. Preferably I employ as the resinous component a water-soluble condensation product of urea or melamine with formaldehyde, especially the methylol ureas, for instance, dimethylol urea, and the methylol melamines, for example, trimethylol melamine, hexamethylol melamine, etc.

The organopolysiloxanes which may be employed in the practice of this invention are those in which the silicon atoms contain only monovalent hydrocarbon radicals attached thereto by a carbon-silicon linkage and have an average ratio of from 1.75 to 3.0, preferably from 1.9 to 2.1, organic groups per silicon atom. These organopolysiloxanes are to be distinguished from the methyl hydrogen polysiloxanes which comprise the third ingredient in the treating mixture. The organopolysiloxanes may be either of the linear or cyclic type. Many examples of such materials may be found disclosed, for example, in Patnode Patents 2,469,888 and 2,469,890, both patents being assigned to the same assignee as the present invention. Preferably the organopolysiloxane is one in which essentially all the organic groups attached to the silicon atoms are methyl groups, although there may also be present other silicon-bonded organic groups, e. g., phenyl groups, etc.

The methyl hydrogen polysiloxanes employed are those which may be prepared, for instance, by hydrolyzing a methyl dihalogenosilane of the formula $CH_3SiHX_2$ where X represents a halogen, for instance, chlorine, bromine, etc. Methods for making the oily hydrolysis products of this type are disclosed more fully in the aforementioned Norton Patent 2,386,359 which by reference is made a part of this specification.

The proportions of urea or melamine resins, organopolysiloxane, and hydrolysis product of the methyl dihalogenosilane may be varied within fairly wide limits without departing from the scope of the invention. Generally, in a treating mixture on a weight basis, it has been found advantageous that the urea or melamine resin comprise from about 0.5 to 15 per cent, preferably from 1 to 10 per cent, and the organopolysiloxane mixture (including the non-hydrogen-containing organopolysiloxane and hydrogen methyl polysiloxane) comprise from 0.5 to 15 per cent, preferably from 1 to 10 per cent, of which from 75 to 95 per cent of the mixture of organopolysiloxanes is the organopolysiloxane free of silicon-bonded hydrogen, and the balance, that is, from 5 to 25 per cent, is the methyl hydrogen polysiloxane, the balance of the treating mixture being made up of either a solvent for the aforementioned ingredients or water, the water acting as a medium in which the other ingredients can be emulsified by use of suitable emulsifying agents. Stated alternatively, and referring specifically to a water emulsion, one range of ingredients which I have found useful comprises from 70 to 98 per cent water, from 0.5 to 15 per cent, by weight, of either the urea or melamine resin, from 0.4 to 12 per cent, by weight, of the organopolysiloxane, and from about 0.05 to 3.5 per cent of the methyl hydrogen polysiloxane.

In order to prepare emulsions of the aforementioned ingredients it is desirable to use various emulsifying agents (preferably those whose emulsifying action is destroyed by heat) as, for instance, such materials as Tetrosan marketed by Onyx Chemical Company and being identified as technical alkyl dimethyl-3,4-dichlorobenzyl ammonium chlorides in which the alkyl groups are normal primary aliphatic radicals having from 8 to 18 carbon atoms, stearamine acetate, etc. It will, of course, be apparent to those skilled in the art that any other suitable emulsifying agent this combination of organopolysiloxanes with 2 per cent, by weight (i. e., equal in weight to the weight of the mixture of organopolysiloxanes), dimethylol urea obtained by condensing urea and formaldehyde, and the rayon and cotton poplin baked for 2 minutes at 150° C. and 1 minute at 400° C. to dry the cloth and cure the resin. Another treating sample containing 2 per cent, by weight, of the organopolysiloxanes and 4 per cent dimethylol urea was also applied to the same cloths and the latter baked under the same conditions. After treatment of the cloths, each cloth was subjected to a water spray test using the method set forth in the 1945 Year Book of the American Association of Textile Chemists and Colorists, vol. 22, pages 229 to 233. All samples had a spray rating of 100 before laundering and dry-cleaning. The table below shows the spray rating of the samples as treated and after laundering and after dry-cleaning.

Table I

| Per Cent of Mixture of Dimethyl Silicone and Methyl Hydrogen Silicone | Per Cent Dimethylol Urea | Cotton Poplin | | | Rayon Challis | | |
|---|---|---|---|---|---|---|---|
| | | As Treated | Laundered | Dry Cleaned | As Treated | Laundered | Dry Cleaned |
| 4 | 0 | 100 | 70+ | 90 | 100 | 80 | 100 |
| 2 | 0 | 100− | 70+ | 80+ | 70+ | 50+ | 80 |
| 0 | 4 | 50 | 50 | 50 | 0 | 0 | 50 |
| 0 | 2 | 50 | 50 | 50 | 0 | 0 | 0 |
| 2 | 2 | 100 | 90 | 90+ | 100 | 80 | 100 |
| 2 | 4 | 100 | 80+ | 100− | 100 | 90+ | 100 | may be employed without departing from the scope of the invention.

One general procedure for making the treating materials employed in the practice of my invention comprises mixing the required amounts of either the urea or melamine resin with a concentrated organopolysiloxane water emulsion (e. g., a 35 to 75 per cent concentration of organopolysiloxane), thereafter adding the methyl hydrogen polysiloxane to the aforementioned mixture and thoroughly agitating the combination of ingredients until a homogeneous emulsion is formed. This latter emulsion may be diluted further with water to, for instance, concentrations in the range of from about 1.0 to 30 per cent, preferably from 3 to 10 per cent.

In order that those skilled in the art may better understand how the present invention may be practiced, the following examples are given by way of illustration and not by way of limitation. All parts are by weight.

EXAMPLE 1

In this example the liquid product of hydrolysis of dimethyldichlorosilane comprising essentially a polymeric dimethylsiloxane was made into a 30 per cent water emulsion (using stearamine acetate as the emulsifying agent). Thereafter, samples of this emulsion were mixed with 15 per cent, by weight, of the hydrolysis liquid product of methyldichlorosilane, based on the weight of the dimethylpolysiloxane, the methyl hydrogen polysiloxane being employed as a 65 per cent, by weight, toluene solution. A portion of this mixture was diluted with water to a four per cent polysiloxane concentration and another portion was diluted to a 2 per cent polysiloxane concentration. Rayon and cotton poplin were treated with these mixtures as well as with one (2 per cent concentration) mixture comprising From the foregoing Table I, it is apparent that dimethylol urea does not exhibit water-repellent properties when used alone but in combination with the mixture of dimethyl and methyl hydrogen silicones gives improved repellency over that obtained with the mixture of polysiloxanes alone. In the treated condition this is best shown by the data on rayon where 2 per cent of the silicone mixture gives but a 70+ spray rating, while the combination with 2 per cent and 4 per cent dimethylol urea gives a spray rating of 100. With 4 per cent dimethylol urea and 2 per cent of the mixture of organopolysiloxanes, the resistance to laundering is superior to that obtained with either 2 per cent or 4 per cent of the mixture of dimethyl and methyl hydrogen polysiloxanes alone.

EXAMPLE 2

In this example, 2.5 parts of a vinyl acetate emulsion polymer (Diapene manufacturd by Quaker Chemical Products Corporation) to control the "handle" of the cloth, were mixed with 4 parts of a water-soluble urea-formaldehyde resin, two parts of a mixture of 85 per cent, by weight, of a non-volatile dimethyl silicone oil chain stoppered with hexamethyl disiloxane to give an oil of about 300 centistokes viscosity (prepared in accordance with U. S. Patent 2,469,888) and 15 per cent, by weight, of a product of hydrolysis of methyldichlorosilane. This mixture of ingredients was formed into an emulsion by employing an emulsifying agent (Tetrosan described above) with 91.5 parts water, using the procedure described in Example 1. This composition was then applied to a wool-rayon gabardine and the latter dried and cured 2½ minutes at 330° F. After allowing the cloth to remain about 15 hours at room temperature, a spray rating of 100 was obtained. Another piece of this same cloth was treated with a composition containing the same treating material as above with the exception that the water-soluble urea-formaldehyde resin and vinyl acetate emulsion polymer were omitted. After drying and curing for 2½ minutes at 330° F. and permitting the treated cloth to remain and age for about 15 hours, the spray rating was 70. The following Table II shows a comparison of the wool-rayon gabardine treated with the two mixtures as regards its original spray rating, its spray rating after three launderings, and its spray rating after one dry-cleaning.

Table II

|  | Original Spray Rating | Spray Rating After Three Launderings | Spray Rating After One Dry Cleaning |
|---|---|---|---|
| 2% Silicone+Resin | 100 | 80+ | 100 |
| 2% Silicone | 80 | 70+ | 80 |

From the foregoing examples it is clearly apparent that the combination of the organopolysiloxane, the methyl hydrogen polysiloxane, and the urea-formaldehyde resin is better than either of the ingredients alone when it comes to improving the water repellency properties of the treated textiles. It will, of course, be apparent to those skilled in the art that instead of the cyclic and chain-stoppered methyl polysiloxanes and methyl hydrogen polysiloxane employed in the foregoing examples, other organopolysiloxanes may be used, many of which have been disclosed in the aforementioned Patnode patent as well as in Agens Patent 2,448,756, issued September 7, 1948, without departing from the scope of the invention. Additionally, instead of the urea-formaldehyde resin, other urea-aldehyde resins may be employed, particularly the water-soluble urea-aldehyde resins, and that in place of the urea-aldehyde resins, melamine-aldehyde resins may be used, also. Instead of employing an emulsion of the ingredients described above it is also possible to use a solution of the ingredients, for instance, to use an organic solvent which is a solvent for the organopolysiloxane, methyl hydrogen polysiloxane, and the urea or melamine resins.

By means of my invention it is possible to improve the water repellency of textiles while at the same time imparting thereto a better crease resistance. The properties of water repellency are not cumulative because of the presence of any one or more of the ingredients but rather unexpectedly show an improvement in properties as regards water repellency which is better than the water repellency induced by using any one of the ingredients in the mixture separately. This was entirely unexpected and in no way could have been predicted knowing the effect of using either the resins or the organopolysiloxanes for inducing water repellency or for any other similar purpose.

What I claim as new and desire to secure by Letters Patent of the United States is:

1. A composition adapted for rendering textiles water-repellent comprising, by weight, (a) from 0.5 to 15 percent of a resinous composition selected from the class consisting of water-soluble urea-aldehyde and water-soluble melamine-aldehyde resins, (b) from 0.4 to 12 percent of an organopolysiloxane free of silicon-bonded hydrogen in which all the organic groups are attached to silicon atoms by carbon-silicon linkages and there are present from 1.9 to 3.0 organic groups per silicon atom, and (c) from 0.05 to 3.5 percent of a methyl hydrogen polysiloxane comprising the liquid product obtained by hydrolyzing methyldichlorosilane, the aforesaid treating composition being in the form of an emulsion of the mixture of polysiloxanes and a water solution of the resinous composition.

2. A composition adapted for rendering textiles water-repellent comprising, by weight, (a) from 0.5 to 15 percent of a water soluble urea-aldehyde resin, (b) from 0.4 to 12 percent of an organopolysiloxane free of silicon-bonded hydrogen in which all the organic groups are attached to silicon atoms by carbon-silicon linkages and there are present from 1.9 to 3.0 organic groups per silicon atoms, and (c) from 0.05 to 3.5 percent of a methyl hydrogen polysiloxane comprising the liquid product obtained by hydrolyzing methyldichlorosilane, the aforesaid treating composition being in the form of an emulsion of the mixture of polysiloxanes and a water solution of the urea-aldehyde resin.

3. A composition adapted for rendering textiles water-repellent comprising, by weight, (a) from 0.5 to 15 percent of a water soluble melamine-aldehyde resin, (b) from 0.4 to 12 percent of an organopolysiloxane free of silicon-bonded hydrogen in which all the organic groups are attached to silicon atoms by carbon-silicon linkages and there are present from 1.9 to 3.0 organic groups per silicon atoms, and (c) from 0.05 to 3.5 percent of a methyl hydrogen polysiloxane comprising the liquid product obtained by hydrolyzing methyldichlorosilane, the aforesaid treating composition being in the form of an emulsion of the mixture of polysiloxanes and a water solution of the malamine-aldehyde resin.

4. A composition adapted for rendering textiles water-repellent comprising, by weight, (a) from 1 to 10 percent of a water soluble urea-formaldehyde resin, (b) from 0.4 to 12 percent of a methylpolysiloxane free of silicon-bonded hydrogen in which all the methyl groups are attached to silicon atoms by carbon-silicon linkages and there are present from 1.9 to 3.0 methyl groups per silicon atom, and (c) from 0.05 to 3.5 percent of a methyl hydrogen polysiloxane comprising the liquid product obtained by hydrolyzing methyldichlorosilane, the aforesaid treating composition being in the form of an emulsion of the mixture of polysiloxanes and a water solution of the urea-formaldehyde resin.

THOMAS J. RASMUSSEN.

REFERENCES CITED

The following references are of record in the file of this patent:

UNITED STATES PATENTS

| Number | Name | Date |
|---|---|---|
| 2,191,362 | Widmer et al. | Feb. 20, 1940 |
| 2,386,259 | Norton | Oct. 9, 1945 |
| 2,500,842 | MacKenzie et al. | Mar. 14, 1950 |
| 2,500,843 | MacKenzie et al. | Mar. 14, 1950 |
| 2,511,296 | Rust | June 11, 1950 |